United States Patent [19]

Neuman

[11] 4,021,515
[45] May 3, 1977

[54] PLASTIC INJECTION MOLD WITH SELF-ADJUSTING CORING APPARATUS

[75] Inventor: Clayton L. Neuman, Coon Rapids, Minn.

[73] Assignee: A-1 Engineering, Inc., Coon Rapids, Minn.

[22] Filed: Apr. 15, 1976

[21] Appl. No.: 677,271

[52] U.S. Cl. .............................. 264/40.5; 264/328; 425/149; 425/249; 425/468
[51] Int. Cl.² ...................... B29F 1/022; B29F 1/06
[58] Field of Search .......... 425/249, 414, 135, 468, 425/149, 150; 264/40.3, 40.5, 328

[56] References Cited

UNITED STATES PATENTS

| | | | |
|---|---|---|---|
| 3,060,509 | 10/1962 | McCubbins, Jr. ................ | 425/149 |
| 3,301,928 | 1/1967 | Plymale ............................ | 425/468 |
| 3,473,197 | 10/1969 | Wilds et al. ....................... | 425/249 |
| 3,737,272 | 6/1973 | Segmuller ....................... | 425/468 V |
| 3,816,047 | 6/1974 | Mohler ............................ | 425/249 |
| 3,849,053 | 11/1974 | Bruce et al. ..................... | 425/468 X |

FOREIGN PATENTS OR APPLICATIONS 2,516,120  11/1975  Germany ........................... 425/149

Primary Examiner—Francis S. Husar
Assistant Examiner—W. R. Briggs
Attorney, Agent, or Firm—Merchant, Gould, Smith, Edell, Welter & Schmidt

[57] ABSTRACT

Plastic injection molding apparatus consisting of two mold sections which define a mold cavity therebetween and are relatively movable to permit formation and removal of an article through the injection of hot melted plastic under high pressure. A plurality of coring pins are employed in conjunction with the mold sections to create voids of desired configuration in the molded article. Means are included to sense the pressure of the hot melted plastic as it enters the apparatus, and to actuate the coring pins into position within the mold cavity to create the desired voids. The coring pins also sense pressure within the mold cavity to achieve a balanced, self-adjusting operation.

13 Claims, 5 Drawing Figures

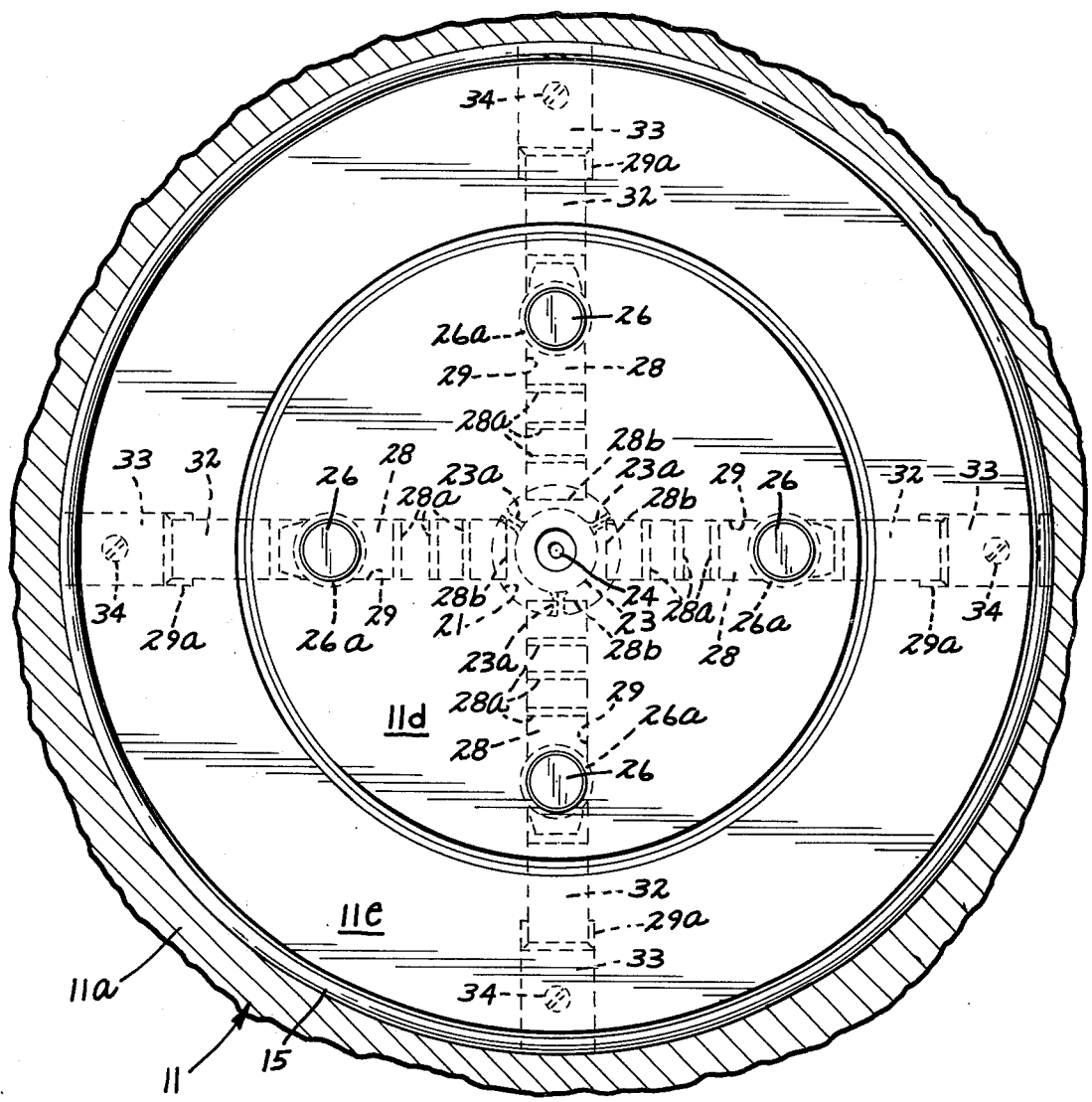
FIG. 3
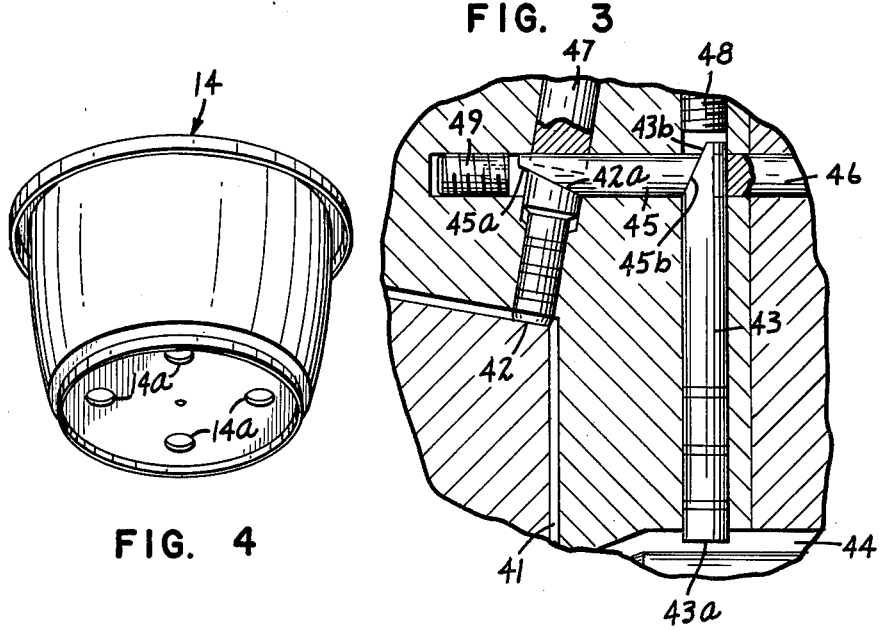
FIG. 4
FIG. 5

PLASTIC INJECTION MOLD WITH SELF-ADJUSTING CORING APPARATUS

The invention is generally related to the art of molding articles by the injection of hot melted plastic under high pressure, and is specifically directed to apparatus for and the method of creating voids of desired configuration in such articles.

The manufacture of molded articles by the injection of hot melted plastic under pressure conventionally involves the use of two molding sections which define a mold cavity therebetween. The mold sections are relatively movable, defining the mold cavity in the closed position and movable to an open position permitting removal of the molded article. Typically, the hot melted plastic is injected into the closed mold cavity under high pressure, filling all areas of the cavity. When the cavity is completely filled, the inlet pressure on the hot melted plastic is removed and the mold opened to release the solidified article. The entire operation may take only a few seconds, depending on size and complexity of the molded article.

It is often necessary to include voids of various configurations in molded articles, which of course require the inclusion of a corresponding obstruction in the mold cavity to prevent the flow of material into the void area. Voids have been created in a number of different ways in the prior art. Among these is the provision of a fixed stud taking the form of the desired void and which forms part of one of the mold sections. As such, the fixed stud directly engages the opposite mold section in the closed position, thus preventing the flow of plastic in that region of the mold cavity which it occupies. Obviously, in order to continuously perform its necessary function, the fixed stud must remain in a close tolerance relationship with the mold section which it engages. Continued, high speed operation of the molding apparatus through repeated cycles creates substantial wear on the fixed stud, particularly around the edges of its flush surface, ultimately resulting in unwanted flashing at the periphery of the void.

Spring loaded coring pins have also been applied in the prior art, but they have not obviated the wearing problem, and the springs wear out quickly. The hot melted plastic is injected into the mold at pressures often on the order of 50,000 psi, and it is virtually impossible to design a spring capable of withstanding such pressures over a period of time.

The subject invention is, therefore, the result of an endeavor to provide plastic injection molding apparatus with some type of means for successfully creating voids of desired configurations through repeated cycles over long periods of time. The invention specifically resides in the provision of a coring pin of desired configuration for each void which is movable into and out of the mold cavity, and means for actuating the coring pin which senses the inlet pressure of the incoming hot melted plastic to force the coring pin into the mold. The coring pin is also constructed to sense pressure of the hot plastic after it has entered the mold, and the force generated by such pressure is offset against the actuating force so that the coring pin essentially "floats" in its operating position. I have found that this structural configuration not only operates with extreme efficiency, but also creates the coring pin to continuously self-adjust with respect to the mold section which it engages, thus eliminating the problem of flashing in the peripheral areas of the void.

In the preferred embodiment, the coring pin is a cylindrical pin having a flush end surface for engaging the mold section, and slideable in a cylindrical opening formed within the opposite mold section. The coring pin actuator also comprises a cylindrical pin which is slideable in a cylindrical bore which is perpendicular to the bore of the coring pin. The outer end of the actuator pin projects into the hot melted plastic inlet chamber to sense its pressure. The inner ends of both the actuator and coring pins are contiguous and cut at complementary bevels to obtain a desired mechanical or movement advantage as the actuator pin moves against the coring pin.

Other features and advantages of the invention appear in the description hereinbelow and the drawings appended hereto.

BRIEF DESCRIPTION OF THE DRAWINGS

FIG. 3 is an enlarged fragmentary sectional view taken along the line 3—3 of FIG. 1;

FIG. 4 is a perspective view of a plastic article molded by the apparatus of FIGS. 1–3; and FIG. 5 is an enlarged fragmentary sectional view of an alternative embodiment of the invention.

DESCRIPTION OF THE PREFERRED EMBODIMENT

Figure 1:
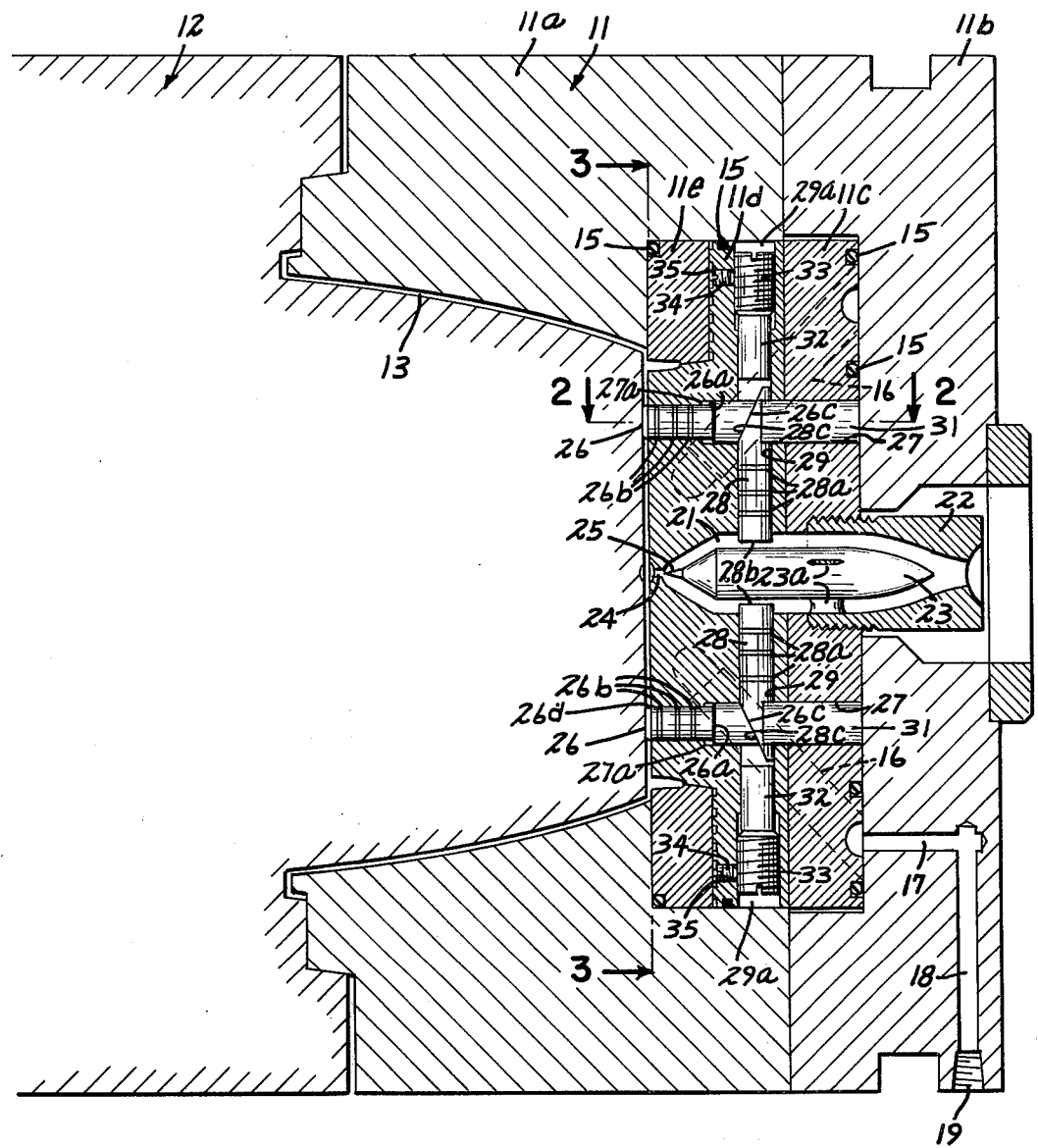
FIG. 1 is a fragmentary sectional representation of molding apparatus embodying the inventive principle.

With initial reference to FIG. 1 of the drawings, molding apparatus embodying the inventive principle is seen to comprise a stationary mold section 11 and a movable mold section 12 which define a mold cavity 13 therebetween. Supporting structure for the mold sections 11, 12 is not shown for purposes of clarity, and means are not shown for moving the mold section 12. The relative movement between mold sections 11, 12 between a closed position defining the mold cavity 13 and an open position permitting release of the molded article is, however, well known in the art.

It will likewise be appreciated that a generation of the mold cavity 13 through 360° would define a circular mold capable of creating a flower pot 14 such as the one depicted in FIG. 4 of the drawings.

Stationary mold section 11 may comprise individual annular sub-sections 11a—e which are mechanically secured together with means not shown and including a plurality of O-rings 15 for sealing purposes. Stationary mold section 11 also comprises a plurality of cooling towers 16 which receive a supply of coolant through bores 17–18 from an inlet 19 to maintain the apparatus at a proper operating temperature.

Hot melted plastic is emitted to the mold through an axial bore which defines an inlet chamber 21. Neither the source of hot melted plastic nor the apparatus for forcing the plastic into the mold under high pressure is shown, such structures being well known in the art. Threadably disposed in the axial bore is a tubular support member 22 which receives and offers support to a hot tip bushing shank or heating torpedo 23. Heating torpedo 23 is mounted intermediate its length by three equiangular legs 23a, and it projects outwardly from the tubular support member 22 and into the inlet chamber 21. Heating torpedo 23 includes a heat source which usually takes the form of an electrical resistance heater, and is thermostatically controlled by means not shown.

Inlet chamber 21 tapers to a small inlet bore 24 which is also referred to in the art as a freeze-off gate. Heating torpedo 23 tapers to a sharp tip 25 which cooperates with the freeze-off gate 24 during operation of the mold as will be described in further detail below.

Figure 2:
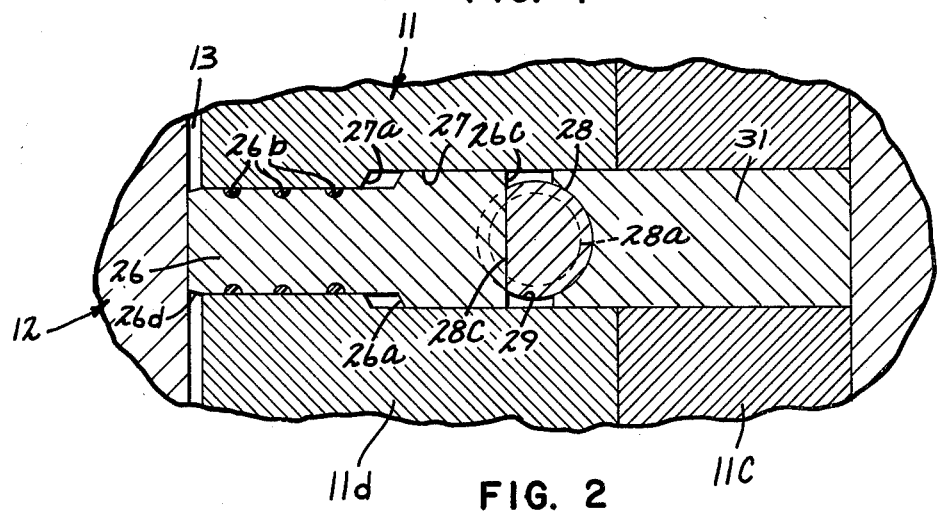
FIG. 2 is an enlarged fragmentary sectional view taken along the line 2—2 of FIG. 1.

With additional reference to FIGS. 2 and 3 of the drawings, the molding apparatus further includes a plurality of coring means each of which is disposed for movement into the mold cavity to prevent the flow of hot melted plastic in a particular region to create a void of desired configuration. In the flower pot example, it is desired to include four such voids, each being a circular configuration in the pot bottom for drainage purposes and designated by the reference numeral 14a in FIG. 4.

In the preferred embodiment, each coring means comprises a coring pin 26 which is essentially cylindrical in shape and is disposed for axially sliding movement within a bore 27 formed through the mold sections 11c, d and having an axis parallel to the primary axis of the molding apparatus. As particularly shown in FIG. 2, both the coring pin 26 and its bore 27 are stepped down to define shoulders 26a, 27a, respectively to form a mechanical stop for the coring pin 26. Coring pin 26 further comprises a plurality of annular grooves 26b in which hot melted plastic may enter during operation of the molding apparatus, subsequently hardening to form a permanent seal against the leakage of hot plastic.

Operating in conjunction with each of the coring pins 26 is an actuator pin 28 which is slideably disposed in a cylindrical bore 29 which is formed perpendicularly to the axial bore 27. With reference to FIG. 3, it will be seen that each of the actuator pin bores 29 is disposed within the mold section 11d, the four bores being disposed in a radial configuration. As shown in FIG. 1, each of the actuator pins 28 also includes a plurality of annular grooves 28a which fill with plastic to form a seal against the leakage of plastic through the bore.

The inner radial end 28b of each of the actuator pins 28 projects into the inlet chamber 21, and, as such, is exposed to and senses the pressure of incoming hot melted plastic. The outer radial end of each actuator pin 28 is cut at an angle to define an oblique planar surface 28c, as is the adjacent axial ends 26c of coring pins 26. It will be appreciated that these two oblique planar surfaces are complementary, and that the radially outward movement of the actuator pin 28 therefore acts through a predetermined mechanical advantage in effecting axial movement of the coring pin 26 into the mold cavity 13. It will be further appreciated that the angle defined by these two oblique surfaces can be varied to achieve a desired degree of mechanical advantage or degree of movement.

Also disposed within the axial bore 27 is a support pin 31 which is held in a fixed position by the presence of section 11b, and which prevents the actuator pin 28 from bending rearwardly within the bore 27 by the forces generated during operation of the apparatus.

Also disposed within the bore 29 is a stop pin 32 the axial position of which is determined by an adjusting screw 33 which is disposed in a threaded portion 29a of bore 29. Adjusting screw 33 is locked in place by a set screw 34 which is disposed in a threaded bore 35 formed in section 11d perpendicular to the bore 29. Adjusting screw 33 preferably positions the stop pin 32 to create a gap on the order of 1/16th of an inch with the extreme of actuator pin 28, thus preventing excessive movement by the actuator pin 28 or the coring pin 26.

In operation, with the movable mold section 12 in its closed position as shown in FIG. 1, hot melted plastic is injected into the molding apparatus through the tubular support member 22, around the heating torpedo 23 and into the inlet chamber 21. By reason of the restrictive dimension of freeze-off gate 24, pressure builds instantaneously within the chamber 21, acting on the inner radial end 28b of each of the actuator pins 28, causing them to move radially outward. This movement of course effects axial movement of the coring pin 26, causing them to project into the mold cavity 13, with their extreme flat ends engaging the opposing flat surface of mold section 12. By this time, the hot melted plastic has passed through the restrictive freeze-off gate 24, flowing throughout the mold cavity 13. The presence of coring pins 26, however, precludes the entry of hot melted plastic into those regions so occupied, thus creating the desired voids or drainage openings 14a.

With specific reference to FIG. 2, it will be observed that the extreme end of coring pin 26 is slightly tapered as shown at 26d. Accordingly, the pressure appearing in inlet chamber 21, which ultimately equalizes throughout the mold cavity 13, is applied against the tapered surface 26d. By reason of the angled surface, the resulting pressure force includes an axial force component which acts against the direction of movement initiated by the actuator pin 28. These offsetting forces tend toward a balanced or floating operation of the pins 26, 28. It has been found that this floating operation substantially reduces wear between the coring pin 26 and the opposing surface of mold section 12; and, to the extent that wear does occur, the structural relationship enables the coring pin 26 to be entirely self-adjusting. As such, flashing along the peripheral edge of the drainage openings 14a is virtually eliminated.

After high pressure equalization occurs within the mold cavity 13, the pressure is released, mold section 12 withdrawn and the resulting flower pot 14, which has since cooled to a solidified state, is ejected from the mold cavity 13. The overall operation is enhanced by the presence of tip 25 of the heating torpedo 23, the temperature of which is varied to permit plastic to flow to the freeze-off gate 24 to fill the mold cavity 13, and to permit solidification of the plastic at the freeze-off gate 24 when the mold cavity 13 is filled and pressure is released.

FIG. 5 is an alternative embodiment of a coring pin and the means for its actuation into a mold cavity. The alternative embodiment includes a mold cavity 41 and a coring pin 42 which projects into the mold cavity 41 from the side rather than from the bottom as was the case in the primary embodiment. A primary actuator pin 43 has its inner end 43a disposed in an inlet chamber 44, with its extreme end beveled as at 43b in a manner similar to actuator pin 28. Because of the direction of entry of coring pin 42 into the mold cavity 41, however, a secondary actuator pin 45 is necessitated. Pin 45 has a beveled surface 45a which complements and cooperates with the beveled surface 42a of coring pin 42 and a beveled surface 45b at its opposite end which complements and cooperates with the surface 43b of primary pin 43. Support pins 46, 47 are included for backup support to the actuator pins 43, 45; and adjusting screws 48, 49 serve as adjustable stops for the actuator pins 43, 45.

As described, the alternative embodiment of FIG. 5 demonstrates how various actuating configurations may be used to sense the pressure of hot melted plastic within an inlet chamber, and to generate a force from the pressure which is transmitted to the coring pin causing its projection into the mold cavity. It will be appreciated that various structural configurations can be utilized to accomplish the desired function.

I claim:

1. Apparatus for molding articles, comprising:
   a. first and second mold sections defining a mold cavity therebetween, the mold sections being relatively movable between open and closed positions;
   b. one of said mold sections having an inlet passage for conveying flowable molding material to the mold cavity under pressure;
   c. coring means disposed in one of said mold sections and being constructed and disposed for movement into the mold cavity to create a void of desired configuration in the molded article;
   d. and actuator means communicating with said inlet passage and operable to sense the pressure of molding material in the inlet passage and actuation means engaging said coring means and operable to move the coring means into the mold cavity as a function of said pressure.

2. The apparatus defined by claim 1, wherein the coring means includes means to sense the pressure of molding material in the molding cavity and arranged such that the force generated by molding cavity pressure is offset against the force of said actuator means.

3. The apparatus defined in claim 2, wherein the coring means comprises a pin member of desired cross sectional configuration and movable along a predetermined axis, the pin member having a surface exposed to the mold cavity which is capable of generating a force component from said mold cavity pressure which acts along said axis of movement, and is offset against the force of the actuator means.

4. The apparatus defined by claim 3, wherein the pin member is cylindrical in shape and movable in a cylindrical bore formed in one of said first and second mold sections, the extreme end of the pin member being flat for non-flashing engagement with the other of said mold sections, the side surface of said pin member adjacent the extreme end being tapered to create said offsetting force.

5. The apparatus defined by claim 1, wherein:
   a. the coring means comprises said elongated coring pin having first and second ends, the first end being projectable into the mold cavity to create said void, and the second end having an oblique surface;
   b. and the actuator means comprises actuator pin means having a first end and a second end, the first end being disposed within said inlet passage to sense pressure therein, the second end having an oblique surface complementing the oblique surface of the coring pin and disposed for sliding engagement therewith, whereby movement of the actuator pin effects corresponding movement of the coring pin.

6. The apparatus defined by claim 5, wherein the actuator pin means comprises a single pin member.

7. The apparatus defined by claim 6, wherein the coring and actuator pins are mutually perpendicular.

8. The apparatus defined by claim 6, wherein the coring and actuator pins are cylindrical in shape and movable in cylindrical bores formed within one of said first and second mold sections.

9. The apparatus defined by claim 8, wherein at least one of said coring and actuator pins further comprises at least one annular groove disposed intermediate its ends, said annular groove adapted to collect plastic material leaking through its associated bore and cooperable with said bore to create a seal after the collected plastic has solidified.

10. The apparatus defined by claim 9, wherein each of said coring and actuator pins comprises a plurality of said annular grooves.

11. The apparatus defined by claim 5, wherein the actuator pin means comprises primary and secondary pin members each having first and second ends, the second ends of each having slideably engaging, complementing oblique surfaces, the first end of the primary pin member being disposed in said inlet passage, and the first end of the second pin member having an oblique surface complementing and slideably engageable with that of the coring pin.

12. The method of creating a void of desired configuration in a molded article made with plastic injection apparatus which comprises relatively movable mold sections defining a mold cavity therebetween and a coring member cooperable with the mold cavity to create said void, the method comprising the steps of:
   a. supplying hot melted plastic to the mold cavity under pressure;
   b. sensing the inlet pressure of the hot melted plastic before it enters the mold cavity;
   c. and moving the coring member into the mold cavity as a function of said inlet pressure before the hot melted plastic fills the mold cavity.

13. The method defined by claim 12, and comprising the further step of sensing pressure within the mold cavity and generating a force as a function thereof which opposes movement of the coring member into the mold cavity.

* * * * *

UNITED STATES PATENT AND TRADEMARK OFFICE
CERTIFICATE OF CORRECTION

PATENT NO. : 4,021,515
DATED : May 3, 1977
INVENTOR(S) : Clayton L. Neuman

It is certified that error appears in the above-identified patent and that said Letters Patent are hereby corrected as shown below:

Column 5, line 25, the word "actuation" should be changed to the word --actuator--.

Signed and Sealed this sixteenth Day of August 1977

[SEAL]

Attest:

RUTH C. MASON
Attesting Officer

C. MARSHALL DANN
Commissioner of Patents and Trademarks